M. C. INDAHL.
DIFFERENTIAL GEAR MECHANISM.
APPLICATION FILED MAR. 8, 1916. RENEWED OCT. 16, 1916.
1,352,269.
Patented Sept. 7, 1920.
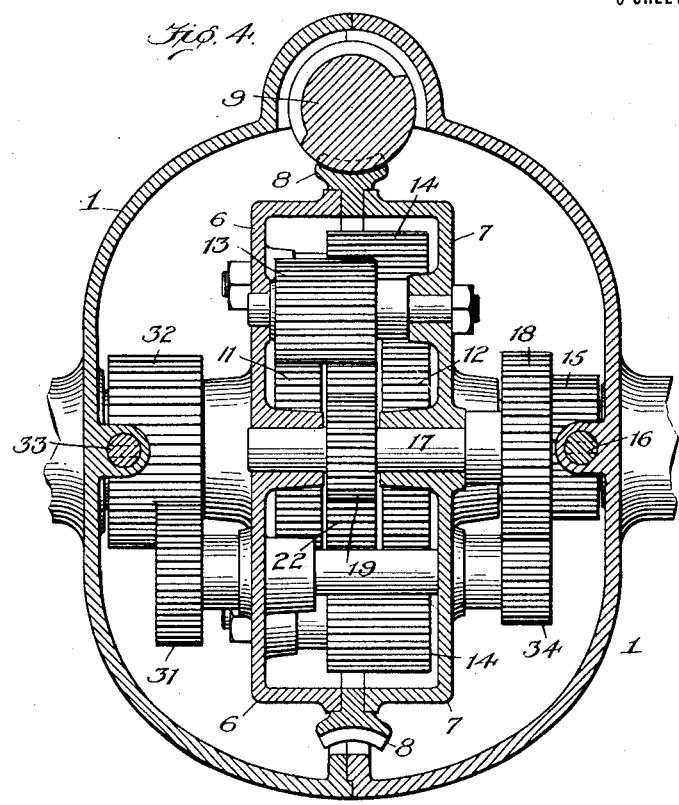
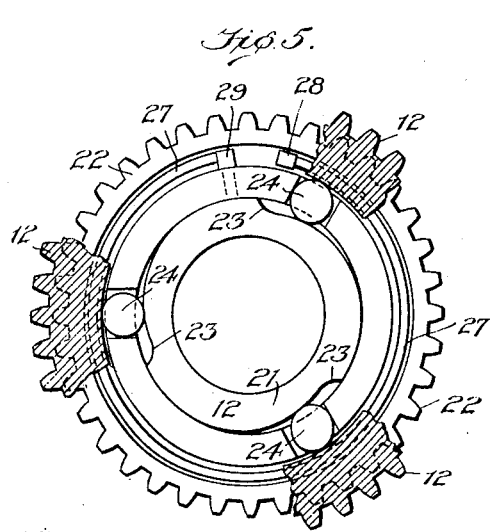
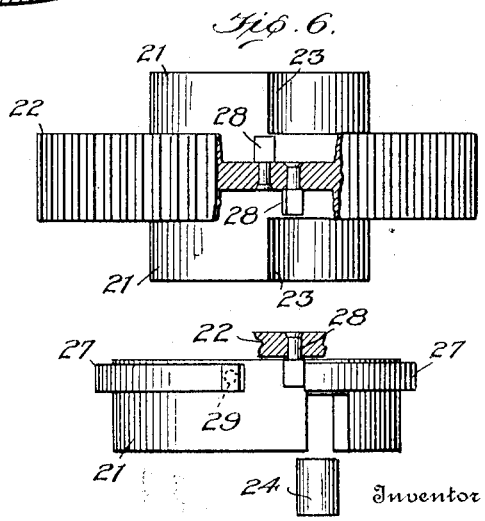

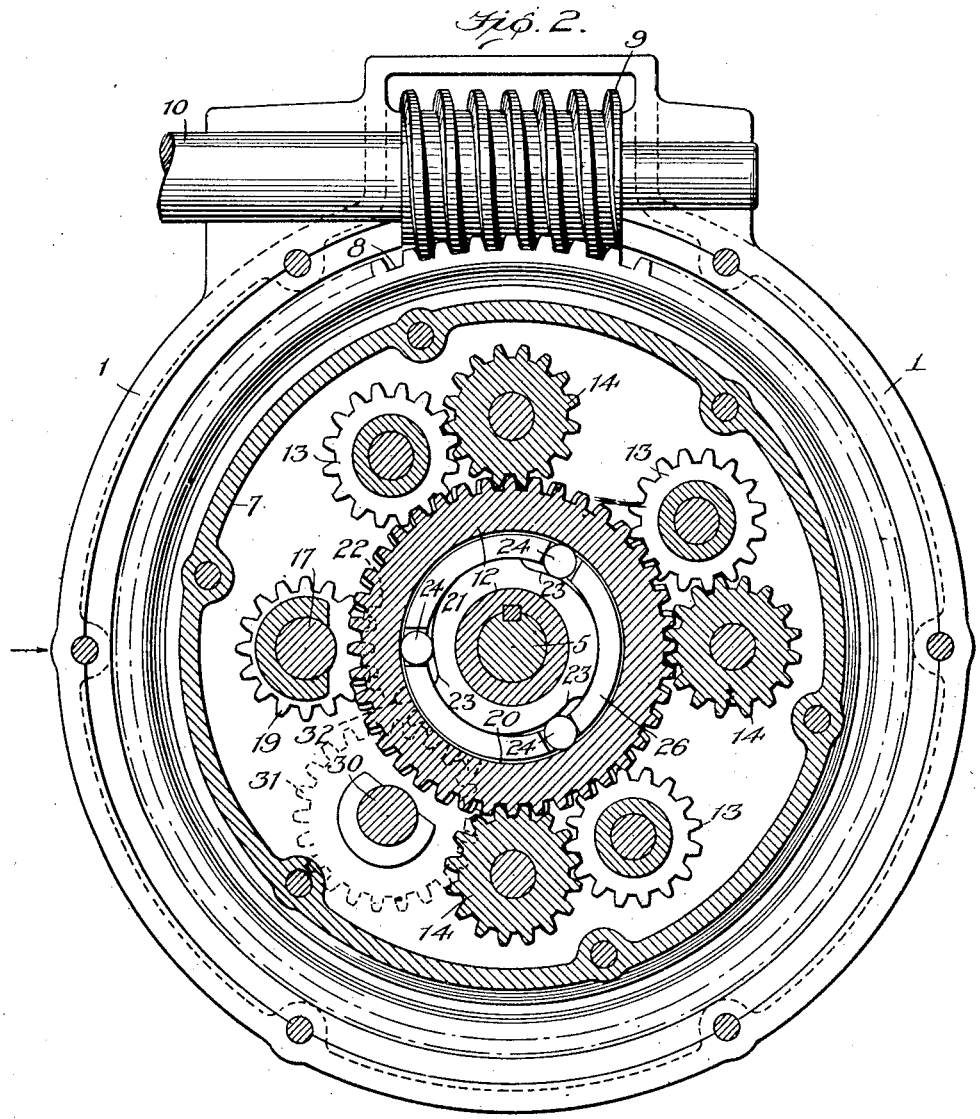

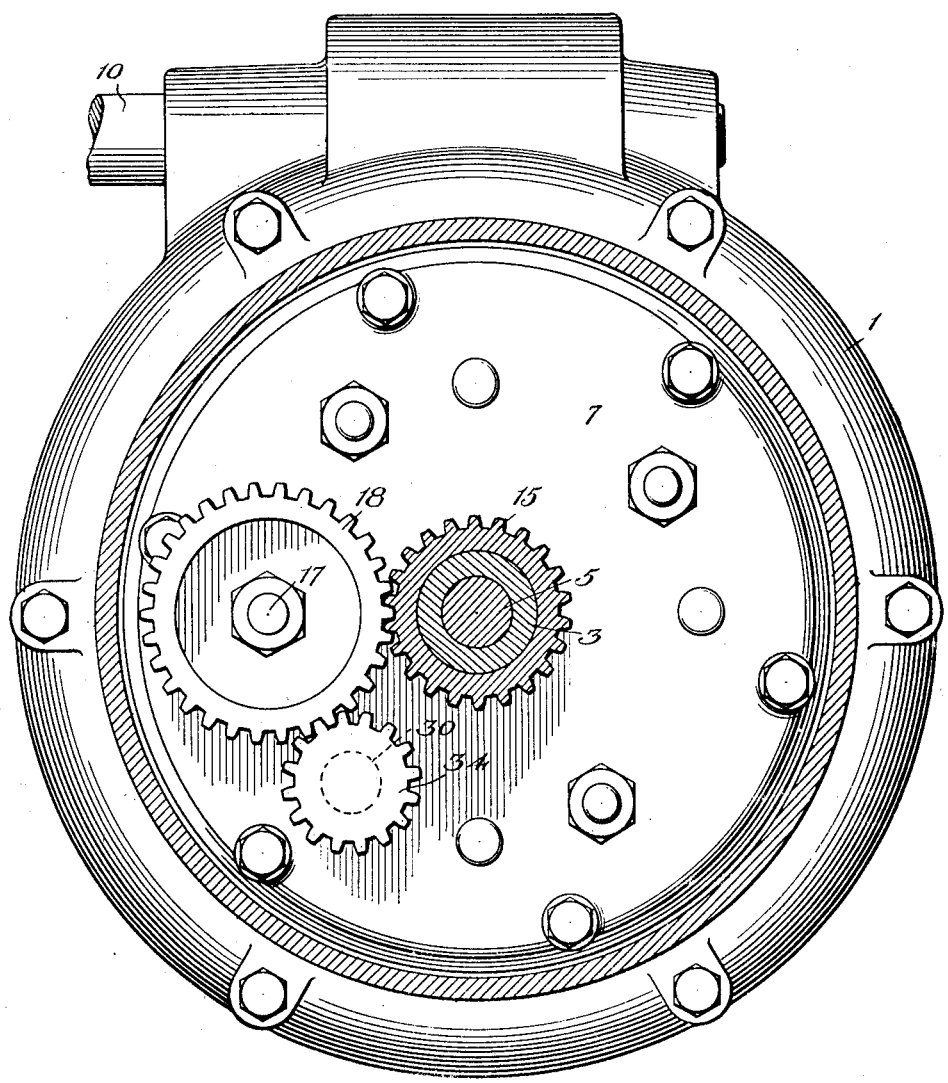

M. C. INDAHL.
DIFFERENTIAL GEAR MECHANISM.
APPLICATION FILED MAR. 8, 1916. RENEWED OCT. 16, 1916.
1,352,269.
Patented Sept. 7, 1920.
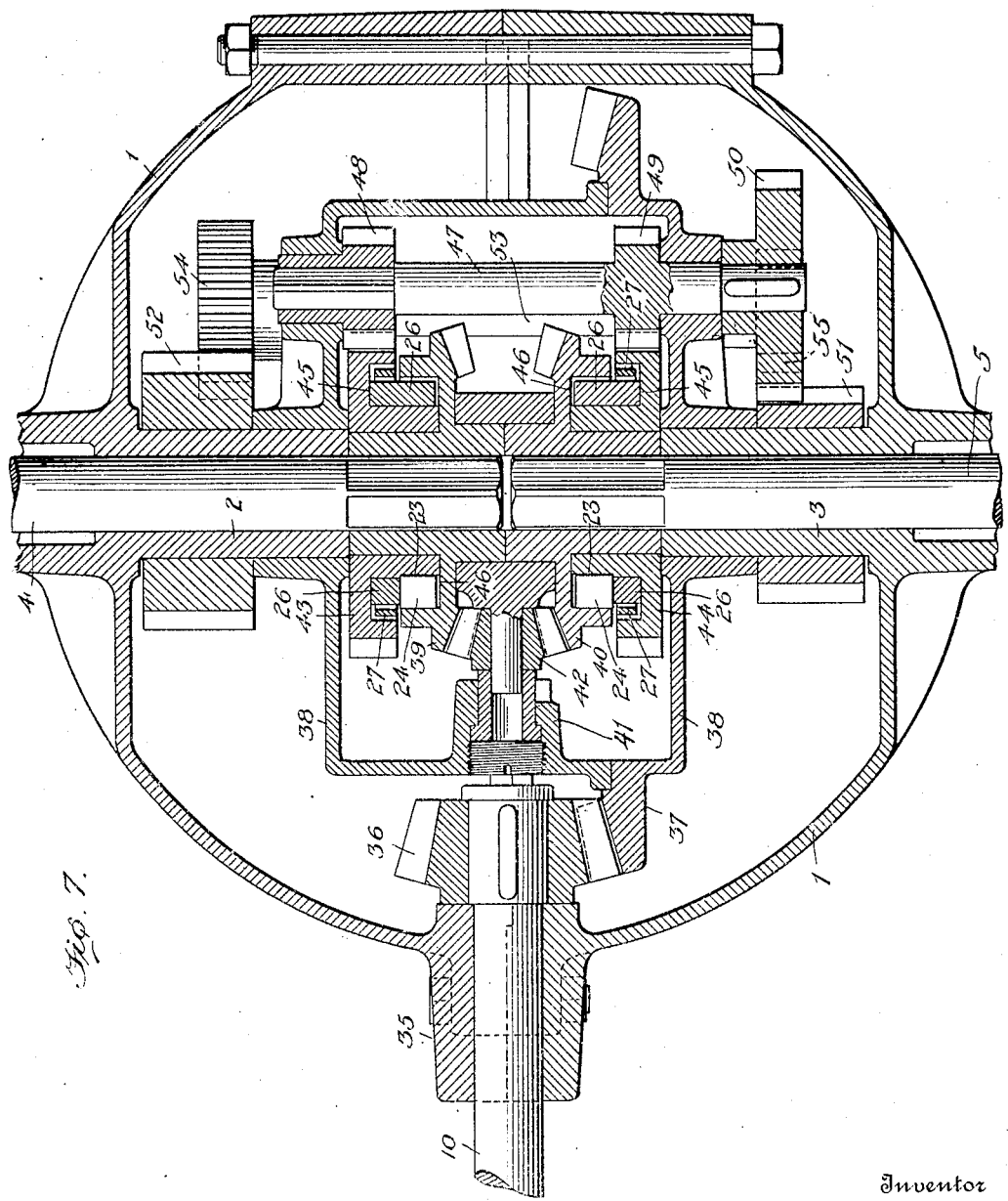

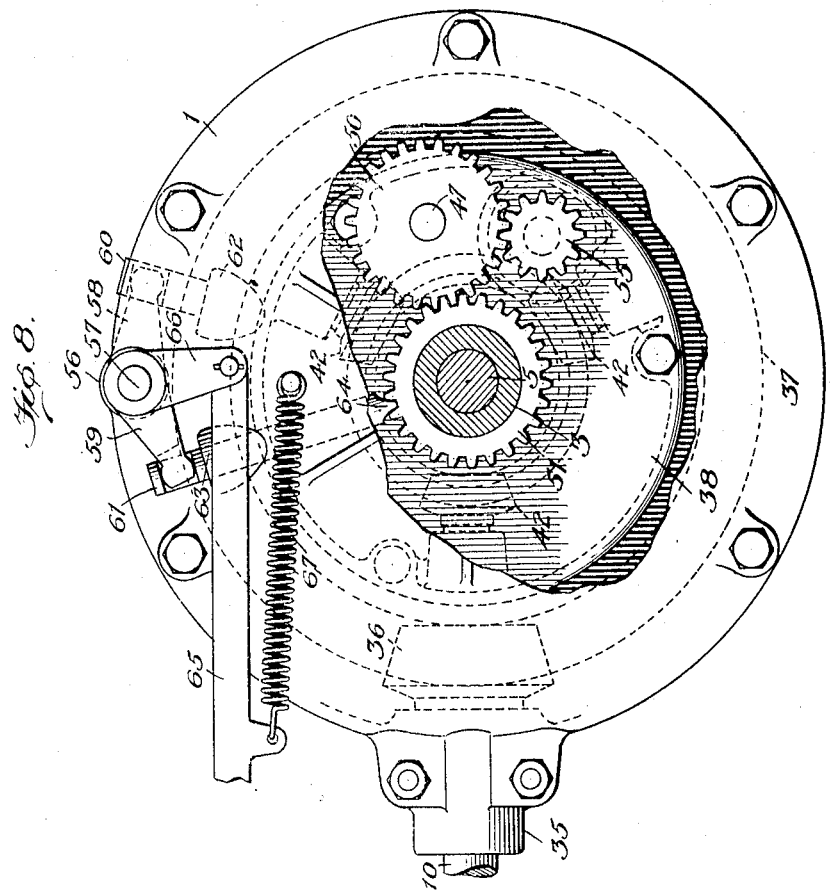
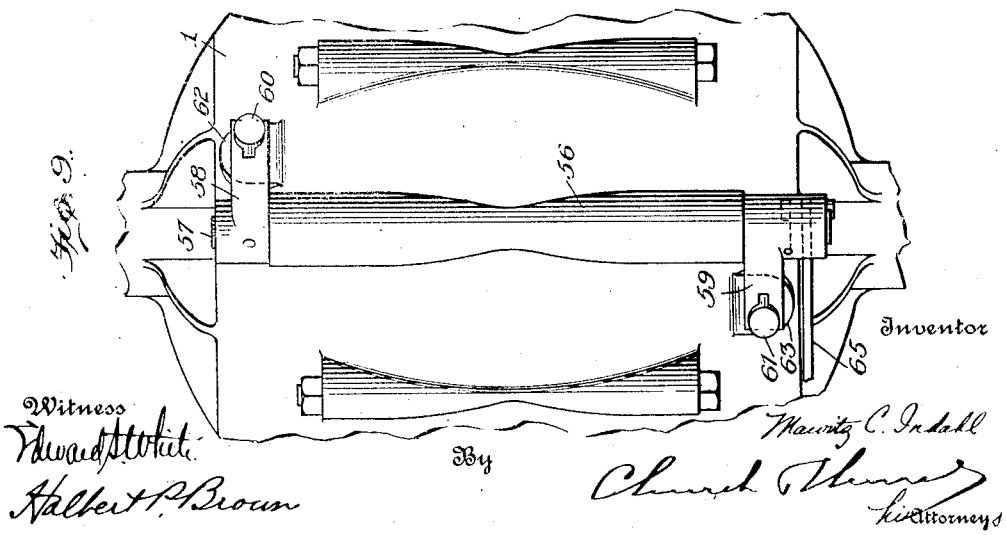

UNITED STATES PATENT OFFICE.

MAURITZ C. INDAHL, OF PHILADELPHIA, PENNSYLVANIA.

DIFFERENTIAL-GEAR MECHANISM.

1,352,269.     Specification of Letters Patent.    Patented Sept. 7, 1920.

Application filed March 8, 1916, Serial No. 82,929. Renewed October 16, 1916. Serial No. 126,035.

*To all whom it may concern:*

Be it known that I, MAURITZ C. INDAHL, a citizen of the United States, residing at Philadelphia, in the county of Philadelphia and State of Pennsylvania, have invented certain new and useful Improvements in Differential-Gear Mechanism; and I do hereby declare the following to be a full, clear, and exact description of the same, reference being had to the accompanying drawings, forming part of this specification.

This invention relates generally to differential gear mechanism, and has for its primary object the provision of an improved and novel means for limiting the ratio of differentiation of a differential gear to a predetermined maximum ratio.

Although it will be understood that the invention is capable of a broad application, its utility is especially felt when employed in connection with differential gears for motor driven vehicles, such as automobiles, and, hence, for convenience, the present description will be confined to this particular use of the invention. The purpose of a differential gear as commonly employed by an automobile, is to divide the power from the motor, equally to the two driven members of a divided shaft, and in such manner that the relative speeds of the two driven members may be changed by outside conditions without affecting the motor. Differential gears embodying this principle are of many types, and give perfectly satisfactory results, in so far as the wheels run with perfect freedom at the speed determined by the size of the wheels so long as the resistance on each wheel is enough to consume one half of the driving power. As soon, however, as the resistance on one of the wheels, which in the case of an automobile is the traction of the wheel, is less than one-half the driving power, or the power distributed to that wheel, the wheel begins to slip, and as the gearing is always equalizing the power between the two wheels or driven members, the result is that the other wheel which may have plenty of resistance or traction will receive only the same amount of power as consumed by the wheel that is slipping. The power which may be utilized being determined by the wheel having the least resistance or traction, a large amount of driving power will consequently be lost by the vehicle at a time when a maximum driving power is most essential. This disadvantageous feature is undoubtedly one of the primary causes of the tendency of automobiles to skid on slippery roads even when the vehicle is running straight ahead.

Although there have been many arrangements purporting to prevent this slipping of one or the other of the driven members or wheels of automobiles, these prior arrangements all have inherent defects which make their practical embodiment and use more or less of a failure. For example, it has been proposed to overcome the slipping when it occurs by manually connecting the two driven members together thereby creating a solid wheel axle. One disadvantage of an arrangement of this character is that when it is put in operation, the differential action of the gearing will be destroyed altogether, involving the creation of great stresses and strains on the working parts. Furthermore the manual control must be intermittent, and thus the utility of manual control is quite limited, if not almost negligible, because, in the event of unforeseen road or traction conditions arising and causing one of the wheels to slip with high velocity, the manual suspension of differential action could not possibly be accomplished quick enough to prevent the damage. Other arrangements employ internal frictional resistance to prevent slipping. The employment of internal frictional resistance in a differential gear is very objectionable, however, because it will consume power, whenever the gear is called upon to differentiate, whether a wheel is slipping or not. In addition, if internal frictional resistance is depended upon to stop slipping of a wheel, there must be a considerable difference in the relative speeds of the two wheels before the friction can be applied, otherwise the employment of friction would in itself be very detrimental to the normal operation of the gear. The result is that a considerable momentum is acquired by the slipping wheel before any resistance can be applied; and thus, the wheel may be brought suddenly to a full stop with a jerk producing very heavy strains and stresses on the gearing as well as on other parts, or, otherwise the wheel will be allowed to keep on slipping at a high rate of speed so that the benefit derived from the internal frictional resistance would be practically negligible.

The present invention employs the novel principle of limiting the ratio of differentiation to a predetermined maximum ratio, in other words, after a predetermined maximum difference in the relative speeds of the two driven members has been reached, governing or controlling means is actuated to positively prevent any further difference in their relative speeds. For example, if the wheel of one of the driven members starts to slip, the increase in speed will be accompanied by a proportional decrease in speed of the other driven member. As the speed of the slipping wheel increases, the speed of the other wheel decreases proportionately, and, finally, when a maximum difference in the relative speeds is reached, the differential gear will be positively prevented from permitting any further differentiation of the relative speeds. Consequently, the slipping wheel will not be able to acquire any further momentum; neither will the other wheel be slowed up any more. The result is that, no further differentiation being permitted, the two driven members or wheels will quickly regain their normal equalized speeds, and this without great loss of power, because of the positive limitation imposed upon the slip of either of the two wheels. If the invention is utilized in an automobile the predetermined maximum ratio of differentiation beyond which no further differentiation can take place, will be calculated from the shortest turning radius of the vehicle, since it is absolutely necessary, in this application of the invention, that differentiation be allowed up to the point of permitting the vehicle to make the shortest possible turn.

A full understanding of the invention will be attained from the ensuing detailed description when taken in connection with the accompanying drawings which illustrate applications of the invention to well-known types of differential gears employed in automobiles. The novel features of the invention will be pointed out in the claims at the end of the specification.

In the drawings:—

Fig. 2 is a transverse vertical sectional elevation of the same on the line 2—2 of Fig. 1.

Fig. 3 is a transverse vertical sectional elevation on the line 3—3 of Fig. 1.

Fig. 4 is a fragmentary longitudinal sectional elevation of the gearing looking in the direction of the arrow of Fig. 2;

Fig. 5 is a detailed side elevation of a preferred form of clutch employed in the present invention;

Fig. 6 is a front elevation of the clutch showing the parts constituting the same disconnected.

Fig. 7 is a horizontal longitudinal sectional elevation of another type of differential gearing provided with present improved governing means;

Fig. 8 is an end elevation partly in section of the same;

Fig. 9 is a fragmentary detail view in plan of the mechanism for reversing the governor when the drive of the gearing is reversed.

Like characters of reference in the several figures indicate the same parts.

Figure 1:
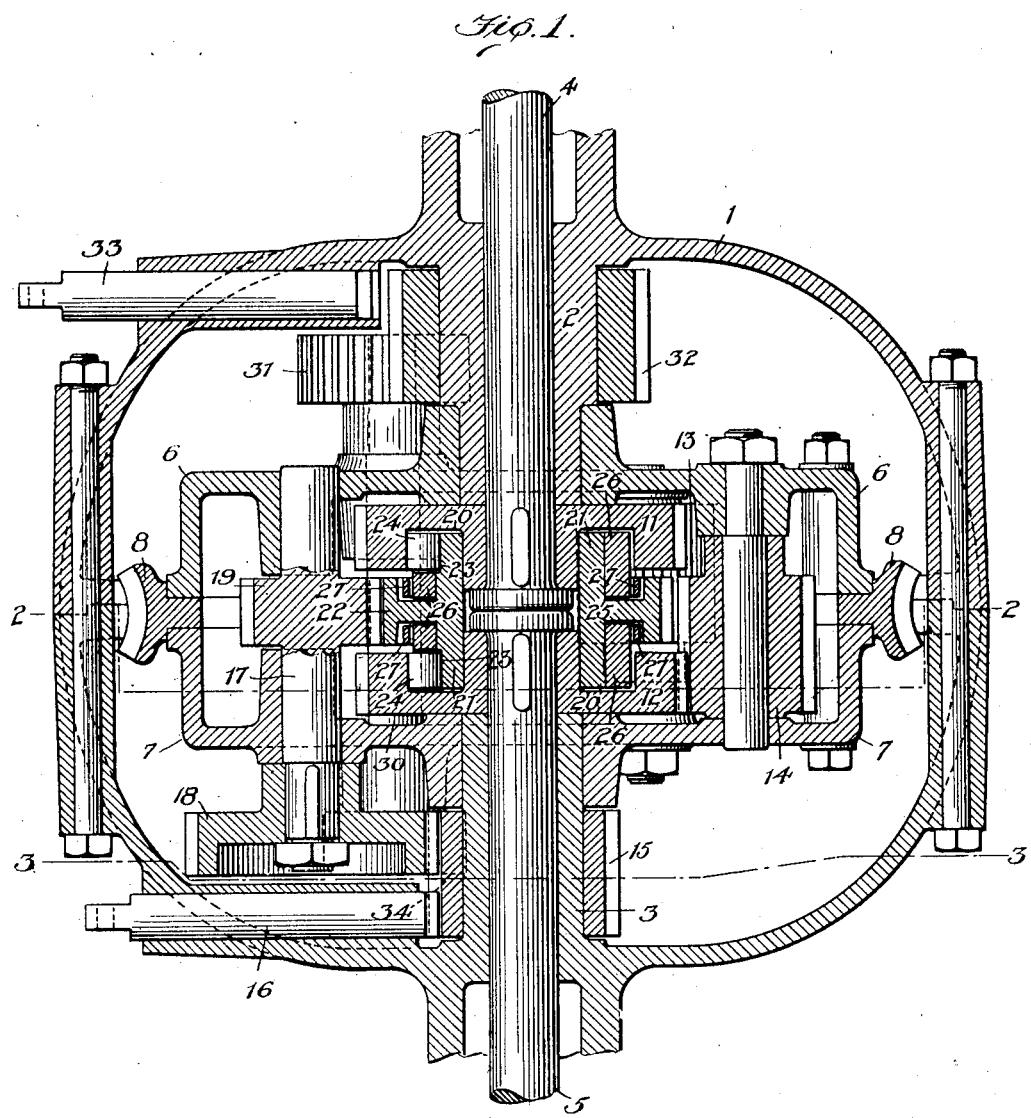
Figure 1 is a horizontal longitudinal sectional elevation of one type of a balanced differential gearing provided with the present improvements.

The differential gearing utilized in the present embodiment of the invention and illustrated in the accompanying drawings may be of the well known balanced type employed in automobiles, wherein the power from the motor is equally distributed to the two driven members of a divided shaft or wheel axle. In the form shown in Figs. 1 to 6, inclusive, the differential gearing is of the spur gear type, wherein the stationary outer casing or shell 1 is provided with suitable sleeve bearings 2, 3, centrally located in the respective right and left hand sides of the shell and in which are journaled the right and left hand driven members 4, 5, of a divided wheel axle. It will be understood that in the present instance each driven member supports and drives at its outer end a wheel, the pair of wheels so supported being usually the rear wheels of the automobile. Rotatably mounted within the outer casing 1 is an inner shell consisting of right and left hand members 6, 7, journaled respectively on the outer surfaces of the sleeve bearings 2, 3. The inner shell members are designed to rotate in unison and to receive motion from a large worm gear 8 rigidly connecting their proximate ends in any suitable manner. Worm gear 8 is in mesh with a worm 9 carried by a shaft 10, suitably journaled in the stationary outer casing 1, as shown in Fig. 2. In the present embodiment, the shaft 10 is the Cardan or transmission shaft of a motor driven vehicle. Keyed respectively to the driven members 4, 5, are the drive gears 11 and 12. The left hand drive gear 12 is in mesh with the pinion 14 of a pair of intermeshing differential pinions; the right hand drive gear 11 is in mesh with the other pinion 13 of said pair. In the ordinary construction there are three pairs of intermeshing differential pinions, as shown more particularly in Fig. 2, each pinion of the several pairs being mounted on an independent axis journaled in the rotating inner shell, as shown in Fig. 1. The operation of differential gearing of this type is well known in the art, it being sufficient to state that the several pairs of pinions 13, 14, serve to distribute the power from the large gear 8 equally to the respective driven members 4, 5, and also permit one driven member to revolve with a greater speed than the normal drive, accompanied by a proportional reduction in speed of the other driven member, and this, without in any way disturbing the Cardan or transmission shaft 10.

The present invention resides particularly in the novel governing means for limiting the ratio of differentiation of the driven members 4, 5, to a predetermined maximum ratio; or to be more explicit, by the present arrangement, when the differential gearing is being operated to permit differential movement and one driven member is rotating at an accelerated rate of speed with a proportional diminished rate of speed in the other driven member, the speed of one driven member cannot be accelerated beyond a predetermined maximum limit and conversely the speed of the other driven member cannot be further diminished. The means for applying this principle in the operation of a differential gear will now be described.

Mounted on the sleeve bearing 3 at the left hand side of the stationary outer casing is a pinion 15, in the present arrangement said pinion being adapted to be either fixed to the stationary casing 1 or left free to rotate on the sleeve bearing 3. This adjustment of said pinion 15 may be conveniently attained by providing a locking bar 16 movably mounted in the outer casing wall and adapted to be moved into interlocking relation with a tooth of the pinion 15. When said bar 16 is moved out of engagement with the pinion 15, the latter is left free to rotate on the bearing 3. Journaled for free rotation in suitable bearings in the inner rotating shell is a shaft 17 which passes out of said shell from the left hand side thereof and fixed adjacent the left hand end of the shaft is a pinion 18 in mesh with the pinion 15. Also fixed to the shaft 17 is a pinion 19 located within the inner shell and substantially centrally between its sides, as shown more particularly in Fig. 1.

The proximate inner faces of the gears 11 and 12 are formed with annular recesses 20, which recesses respectively receive the opposite ends of the hub 21 of a gear 22 located between said gears 11 and 12 and meshing with the pinion 19. Gear 22 will be hereinafter termed the "governing gear." The outer surface of each end of hub 21 of the governing gear 22 is formed with inclined roller recesses 23 in each of which is mounted a roller 24, as shown in Fig. 2. The said rollers 24 form complementary clutch members which coöperate with the inclined roller recesses 23, the latter being in fact clutch surfaces permitting governing gear 22 to be clutched to a gear 11 or 12, when the rollers are advanced to the upper ends of the inclined recesses, and also disengaging governing gear 22 from a gear 11 or 12, when the rollers retreat into the bottoms of said inclined recesses. Above the hub 21, each side of the governing gear 22 is recessed annularly, as shown at 25, and projecting into each annular recess 25 and also into each proximate annular recess 20 of the gears 11, 12, are cage members or rings 26 supporting the rollers 24, there being a cage member or ring on each side of the governing gear 22, as shown in Fig. 1 of the drawings. The construction of a ring or cage 26 is illustrated in detail in Figs. 5 and 6. Surrounding said cage is a spring ring 27, having one end fastened, as at 28, to the governing gear 22, and the other end fastened, as at 29, to the cage 26. The tension of the spring is in a direction to impart a slight backward rotary movement to the cage and thereby advance the rollers 24 toward the upper ends of their respective inclined roller recess 23.

The governing mechanism above described will be connected with the differential gearing, for operation when the vehicle is being driven forwardly, by manipulating locking bar 16 to lock pinion 15 to the stationary outer casing 1. In the normal operation of the differential gearing the Cardan shaft 10, through the medium of a worm 9, drives the large worm gear 8 in the forward direction, indicated by the arrow in Fig. 2. This causes the inner shell to rotate, carrying around with it the several pairs of differential pinions 13, 14, and distributing through said pinions one half of the driving power to each of the drive gears 11, 12, so as to drive the right and left hand members 4, 5, of the wheel axle normally with a uniform speed and in the same direction as the inner shell. Pinion 15 being fixed to the outer casing, said pinion acts as a rack on which the pinion 18 of shaft 17 travels, causing pinion 18 to rotate also on its own axis in the same direction as the inner shell. Pinion 19, however, also has a planetary motion around the meshing governing gear 22, so that governing gear 22 is rotated in the same direction as the rotating shell and the drive gears 11, 12. The ratio of the gears 22, 19, 18 and 15 is such that the governing gear 22 travels at a slower rate of speed than the drive gears 11, 12. The quicker movement of the drive gears 11, 12, opposes the pull of springs 27 on their respective rings or cages 26, which pull, as hereinbefore stated, is in a direction to turn the rings opposite to the direction of rotation of the governing gear 22 and the drive gears 11, 12, so that the rollers 24 of the clutch are pushed forwardly by the more rapidly rotating gears 11, 12, and thus, the rollers retreat into the bottoms of their respective inclined sockets 23, and the hub 21 of governing gear 22 is entirely disengaged from the drive gears 11, 12. The operation of governing gear 22 being independent of the drive gears, no resistance whatever is offered to the normal equalized speed of the two driven members, nor to the differential action of the gearing under normal conditions such as when the vehicle is turning curves, until a predetermined ratio of differentiation is reached. In practice these normal conditions will be maintained up to the maximum differentiation in speed of the driven members required, the maximum normal differentiation being that determined by the shortest turning radius of the vehicle. When the wheel of one of the driven members, such as the member 4, slips, the speed of driven member 4 will be accelerated, and the differential pinions 13, 14, will proportionately diminish the speed of the other driven member 5. As the acceleration of driven member 4 increases, the speed of member 5 diminishes in the same proportion, until the ratio of differentiation, or the difference in speed between the two driven members, has reached the point when driven member 5 is traveling at the same rate of speed, as the governing gear 22. At this point the difference in speed between the two driven members has reached a predetermined maximum ratio beyond the maximum difference in speed required for normal operation of the differential gearing, and the clutch becomes effective to connect drive gear 12 with the governing gear 22. This action of the clutch takes place as soon as the speed of driven member 5 equals the speed of pinion 22, because of the removal of the resistance to spring 27, the released spring acting to rotate cage 26 slightly in a direction opposite to the direction of rotation of gear 22 and drive gears 11 and 12 and advance the rollers 24 out of their respective roller sockets 23, so as to clutch drive gear 12 to pinion 22. The speed of drive gear 12 is now absolutely under the control of governing gear 22 and hence no further diminution in the speed of driven member 5 can take place. Consequently, driven member 4 cannot acquire any further acceleration in speed, thereby placing a positive check on the slipping of the wheel mounted on driven member 4. As a result, the two driven members quickly regain their normal equalized speeds, without in any way jarring the gear or other parts of the machine. The clutch is automatically released as soon as the speed of driven member 5 increases beyond that of governing gear 22. Exactly the same action will take place when driven member 5 slips and the speed of driven member 4 diminishes to the predetermined maximum ratio of differentiation. This maximum ratio of differentiation beyond which no further difference in speed between the two driven members can take place, can readily be determined by an adjustment of the uniform speed of governing gear 22 in any manner well known to those skilled in the art.

In the above described arrangement the motion of the driven members may be reversed by releasing the locking bar 16 from pinion 15, so as to permit said pinion 15 to rotate freely on its sleeve bearing 3. When pinion 15 is so released, the direction of rotation of the differential gearing and the vehicle may be reversed, and the governing means will be inactive under all conditions. Here, it will be noted, that in the event the differential gearing employed in realizing the invention is of the non-reversible type, the pinion 15 may be permanently keyed to its bearing 3 and the locking bar 16 dispensed with. This, however, is an obvious modification well within the scope of the invention.

A feature of considerable importance in the governing means of the present invention, is that, on forward drive, the gearing will be absolutely locked against rotation if both driven members 4, 5, or a single driven member, start to slip backward. Immediately one of the drive gears 11, 12, begins to rotate in the direction opposite to governing gear 22, the rollers 24 will advance out of their sockets, clutching the backwardly slipping drive gear to the governing gear 22. As the governing gear is being driven forwardly, the drive gear must travel in the same direction, or all of the gears will be locked against rotation.

The same result will take place, if it is attempted to drive the vehicle in reverse direction, while the pinion 15 is locked to the stationary outer casing 1. If, under the above condition the drive be reversed, the large gear 8 would be driven in reverse direction, and also the drive gears 11, 12, pinions 18 and 19 and governing gear 22. The speed of said governing gear 22 in reverse direction however would still be slower than the drive gears 11 and 12. Consequently the rollers 24 will be immediately advanced to clutch the drive gears 11 and 12 to governing gear 22. But drive gears 11 and 12 are driven by pinions 13 and 14 at a greater rate of speed than governing gear 22, which governing gear is driven by pinion 19 on shaft 17 so that in the event of the drive gears being clutched to governing gear 22, when the latter is positively driven in reverse direction at a slower speed than said drive gears, the result would be that the drive gears 11 and 12 would have two driving forces acting upon them to drive the said gears at different speeds at the same time. As a consequence, all the gears would immediately lock against rotation. This feature may be advantageously utilized in automobile construction by connecting the locking bar 16 with the reversing gears in any preferred manner well known in the art, so that the locking bar 16 will always be in position to lock pinion 15 to casing 1, unless the reversing gears are thrown in by the operator of the car. Thus the vehicle cannot reverse, except when positively operated to do so.

If it be desired that the governing mechanism of the invention operate on reverse, the same may be effected in the manner shown more particularly in Fig. 4 of the drawings. As shown therein, a shaft 30 is rotatably mounted in suitable bearings in the rotating shell of the differential gearing, the shaft extending clear through the shell on both sides, and having at one end a pinion 31 in mesh with a pinion 32. Pinion 32 is mounted on the sleeve bearing 2 on the side of the stationary casing 1 opposite to pinion 15, and may be locked to the stationary casing or left free to rotate on its bearing by manipulation of a locking bar 33 similar to locking bar 16. At the other end of shaft 30 and fixed thereto is a pinion 34 in mesh with the pinion 18 of shaft 17. When driving in the reverse direction, pinion 15 will be disconnected from the stationary casing 1 and pinion 32 locked to the casing by proper manipulation of locking bars 16 and 33. The movement of the rotating shell will carry around with it shafts 30 and 17, shaft 30 being driven on its own axis in reverse direction, by the engagement of pinion 31 with fixed pinion 32. Shaft 17 however, will be driven forwardly on its own axis and also pinion 19, pinion 34 being in mesh with pinion 18, and pinion 15 being free to rotate on its sleeve bearing 3. The planetary movement of shaft 17, however, is in reverse direction and thus gear 22 will be also driven in reverse direction. The ratio of the gearing at this time is such that the governing gear 22 will be driven in reverse direction at a speed greater than drive gears 11 and 12, so that the rollers retreat into the bottoms of their respective sockets. When the speed of one of the drive gears 11 and 12 accelerates to equal that of governing gear 22, the rollers advance out of their sockets, clutching the accelerated drive gear with the governing gear 22, and permitting no further acceleration in speed. If desired, the locking bars 16 and 33 may be connected with the reversing gears so that, on reverse, locking bar 16 is thrown out of engagement with pinion 15, simultaneously with the throwing in of the reversing gears and locking bar 33 into interlocking engagement with pinion 32.

In Figs. 7 to 9 inclusive, the improved governing mechanism of the present invention is applied to the bevel gear type of differential gearing. As shown in said figures, the Cardan or transmission shaft 10 extends through a bearing 35 formed in the stationary outer shell or casing 1. Within the casing 1, and fixed to the end of shaft 10, is a bevel drive pinion 36, in mesh with a large drive gear 37 carried by the inner rotating shell 38, whereby motion on forward or reverse drive may be imparted to said shell. The rotating shell 38 is journaled for rotation on the sleeve bearings, 2, 3, of the outer casing substantially in the same manner as in the form of differential gearing illustrated in Figs. 1 to 6 inclusive. The right and left hand driven members 4 and 5 are mounted in the respective right and left hand sleeve bearings 2 and 3 of the stationary outer casing; and the said driven members are respectively provided with bevel drive gears 39, 40, as shown more particularly in Fig. 7. Fixed to stub shafts journaled for rotation in inreaching brackets 41 of the rotating shell 38 are the bevel differential pinions 42, these being in the present instance three in number. Each pinion 42 is in mesh with the right and left hand bevel drive gears 39, 40. The above described differential gearing is another well known construction, wherein the power is equally distributed to the respective drive gears 39 and 40, and which permits one of the drive gears, such as the drive gear 39, to rotate at a speed in excess of the normal drive accompanied by a proportionate reduction in speed of the other drive gear 40.

In this form of the invention the governing mechanism for limiting the ratio of differentiation of the gearing to a predetermined maximum ratio, is similar to that previously described, the principal difference being that instead of a single governing gear, as in the spur gear type of differential, two governing gears are employed. The two governing gears, however, are driven in unison, both on forward and reverse, and may be considered as a unit, so far as their operation and effect on the differential gearing is concerned. The right and left hand governing gears 43 and 44 are respectively located on the outer sides of the drive gears 39, 40, and are journaled for free rotation on the hubs of said drive gears. Each governing gear is provided with an annular recess 45 facing the proximate drive gear, the drive gear being also annularly recessed, as at 46, whereby space is provided for the reception of the roller bearing cage 26 of the clutch, which is of the type hereinbefore described, having a spring ring 27 with one end of the spring ring fastened to the respective governing gear and the other end of the spring ring fastened to the cage 26. The rollers 24 of the clutch travel in inclined roller recesses 23 formed in the hubs of the respective governing gears 43 and 44, and the tension of the spring ring 27 is in a direction to advance the rollers 24 from their recesses when a governing gear and a proximate drive gear are traveling at substantially the same speed.

On forward drive, the governing gears 43, 44, are driven forwardly in unison at a speed slower than the normal rate of drive of the drive gears 39 and 40, by a shaft 47, journaled in the rotating shell 38, and having pinions 48 and 49 respectively in mesh with the governing gears 43 and 44. At the left, the shaft 47 extends through the wall of the rotating shell 38 and is provided with a pinion 50 in mesh with a pinion 51 mounted on the sleeve bearing 3. The pinion 51 is adapted to be locked to the stationary casing 1 or left free to rotate on its bearing by the means to be hereinafter described, and it will be understood that said pinion 51 will be locked to the stationary casing at the time when the inner shell 38 is being driven forwardly by the Cardan or transmission shaft 10. Accordingly, during forward drive, the shaft 47 will be driven forwardly on its own axis, in addition to the planetary movement imparted to said shaft by the rotating shell 38, and the ratio of the gears 51, 50, 49 and 48 is such that the governing gears 43, 44 are driven forwardly in unison at a uniform speed less than the normal rate of drive of the gears 39 40. When a wheel of one of the driven members, such as driven member 4, slips, the acceleration acquired by that driven member will be accompanied by a proportionate reduction in speed of the other driven member 5, this effect being accomplished by the differential pinions 42 interposed between the drive gears 39, 40 of the respective driven members. As soon as the speed of the drive gear 40 of driven member 5 equals that of the governing gears 43, 44, the clutch of the proximate governing gear 44 will become effective to positively connect said gear 40 with the governing gears. As a result, no further diminution in speed of the drive gear 40 and driven member 5 can take place, and, consequently, no further acceleration can be acquired by driven member 4. The operation is exactly the same when the speed of driven member 5 is accelerated and the speed of driven member 4 proportionately diminished.

On reverse drive pinion 51 will be unlocked from the stationary outer casing 1, and the motion of shaft 47 on its own axis will be controlled by a pinion 52 on the sleeve bearing 2 at the right hand side of the stationary casing. It will be understood that pinion 52 is left free to rotate on bearing 2 during forward drive and is locked to the stationary casing 1 on reverse drive. As heretofore explained, it is necessary to drive the governing gears at a speed in excess of the normal drive, when the differential gearing and governing mechanism is driven in reverse direction. Extending through the rotating shell 38 is a stub shaft 53, having at its right hand end a pinion 54 in mesh with pinion 52 and at its left hand end a pinion 55 in mesh with the pinion 50. The result is that, on reverse drive, pinion 52, being locked to the stationary casing 1, and pinion 51 left free to rotate on its bearing, shaft 53 will be driven on its own axis reversely, in addition to its planetary movement in reverse direction. Driven pinion 55 is, however, in mesh with pinion 50 of shaft 47, and consequently shaft 47 is rotated on its own axis in forward direction, although the planetary movement of shaft 47 is in reverse direction. The motion of pinions 48, 49 will be added to the motion of governing gears 43, 44, and the ratio of the gearing now driving the said governing gears is such that the governing gears are driven reversely in unison at a speed in excess of the normal reverse drive. When the speed of one driven member accelerates so that the speed of its drive gear equals the speed of the governing gears, the clutch will become effective to connect the proximate drive and governing gears, and prevent further acceleration in speed.

The pinions 51 and 52 are preferably locked and unlocked from the stationary casing 1 by means of the following mechanism, illustrated more particularly in Figs. 8 and 9. Mounted in a suitable bearing 56 formed on the outer face of the stationary casing 1, is an operating shaft 57, having fixed thereto at its opposite ends oppositely-disposed links 58 and 59. Pivoted at the free ends of the respective links 58 and 59 are locking bars 60 and 61. The locking bars are slidable within suitable bearings 62 and 63 formed in the wall of the stationary casing, and each locking bar is formed with a tooth or projection 64 at its inner end, adapted to engage the teeth of a pinion 51 or 52. The shaft 57 may be oscillated by means of an operating bar 65, as shown in Figs. 8 and 9, the said operating bar being pivoted to the free end of a link 66 fixed to the shaft 57. Bar 65 is held normally retracted by means of a spring 67.

With the above construction, if bar 65 is retracted shaft 57 will be oscillated to force locking bar 61 into engagement with pinion 51, thereby locking said pinion to the stationary casing 1. Simultaneously locking bar 60 will be withdrawn from engagement with pinion 52 to release the latter. The parts are shown in this position, in Fig. 8, wherein the governing mechanism is set for operation on forward drive. If the operating bar 65 be advanced, locking bar 61 will be withdrawn from engagement with pinion 51 and locking bar 60 will be forced into engagement with pinion 52, thereby setting the governing mechanism for operation on reverse drive. If the invention is applied to an automobile, the operating bar 65 will be preferably connected with the reversing lever so as to operate in unison therewith. This may be effected in any manner known to those skilled in the art. If desired, the spur gear type of differential may be equipped with the above described connections for setting the governing mechanism.

What is claimed is:

1. The combination with a pair of driven members and means for connecting said members, said means permitting acceleration in speed of one of said members accompanied by a proportionately diminished speed of the other driven member, of positive operating means for limiting the ratio of differentiation in speed of said members to a predetermined maximum ratio.

2. The combination with a pair of driven members and means for connecting said members, said means permitting acceleration in speed of one of said members accompanied by a proportionately diminished speed of the other driven member, of governing mechanism including a governing gear wheel for limiting the ratio of differentiation in speed of said members to a predetermined maximum ratio, said governing mechanism also operative to lock said driven members against rotation reversely to the direction of drive.

3. The combination with a pair of driven members and means for connecting said members, said means permitting acceleration in speed of one of said members accompanied by a proportionately diminished speed of the other driven member, of a speed-controlling mechanism, and means for automatically connecting one of said driven members with said speed-controlling mechanism when the ratio of differentiation in speed of the driven members has reached a predetermined maximum ratio.

4. A device of the class described, comprising differential gearing and a pair of driven shafts connected thereby, and means for driving said differential gearing, said means having normally inactive connections for driving said shafts, said connections being arranged to become effective upon some certain predetermined differences between the speeds of said shafts.

5. A device of the class described, comprising differential gearing and a pair of driven members connected thereby, and means for driving said differential gearing, said means having normally inactive connections for driving said members, said connections being arranged to become effective upon some certain predetermined differences between the speeds of said members.

6. The combination with a pair of driven members and means for connecting said members, said means permitting acceleration in speed of one of said members accompanied by a proportionately diminished speed of the other driven member, of a speed-controlling mechanism, and a spring-actuated clutch for automatically connecting one of said driven members with said speed-controlling mechanism when the ratio of differentiation in speed of the driven members has reached a predetermined maximum ratio.

7. The combination of a pair of driven members, differential mechanism for driving said members, a clutch coöperating with one of said driven members, and means for driving said clutch at a fixed ratio to the average speed of the two driven members.

8. The combination of a pair of driven members, differential mechanism for driving said members, a clutch coöperating with one of said driven members, and means for driving said clutch at a speed the ratio of which with respect to the average speed of the driven members is greater than unity.

9. The combination of a pair of driven members, differential mechanism for driving said members, a clutch coöperating with one of said driven members, and means for driving said clutch at a speed the ratio of which with respect to the average speed of the driven members is less than unity.

10. The combination of a pair of driven members and differential mechanism for driving said members, a one-way clutch coöperating with one of said members, said clutch comprising two parts, one part of the clutch having a fixed speed relation to the member with which it coöperates, and means for driving the other part of said clutch at a fixed speed ratio to the average speed of the two driven members.

11. The combination with a pair of driven members and means for connecting said members, said means permitting acceleration in speed of one of said members accompanied by a proportionately diminished speed of the other driven member, of a speed governing member driven at a uniform rate of speed, and means for connecting one of the driven members with said governing member when the speed of such driven member substantially equals the speed of the governing member.

12. The combination with a pair of driven members and means for connecting said members, said means permitting acceleration in speed of one of said members accompanied by a proportionately diminished speed of the other driven member, of a speed governing member driven at a uniform rate of speed slower than the normal rate of drive of the driven members, and means for connecting a driven member with the governing member when the speed of such driven member is diminished to substantially equal that of the governing member.

13. The combination with a pair of driven members and intermediate connections permitting acceleration in speed of one of said members accompanied by a proportionately diminished speed of the other driven member, of a speed governing member driven at a uniform rate of speed, different from the normal rate of drive of the driven members, and a spring-actuated clutch for automatically connecting one of the driven members with said governing member when the speed of such driven member substantially equals the speed of the governing member.

14. The combination with a pair of members adapted to be driven forwardly or reversely and intermediate connections permitting acceleration in speed of one of said members accompanied by a proportionately diminished speed of the other driven member, of a speed governing member driven forwardly at a slower rate of speed than the normal rate of drive of the driven members when the latter are driven forwardly and reversely at a quicker rate of speed than said driven members when the latter are driven reversely, and means for connecting a driven member with the governing member, when the speed of such driven member substantially equals the speed of the governing member.

15. The combination with a pair of members adapted to be driven forwardly or reversely and intermediate connections permitting acceleration in speed of one of said members accompanied by a proportionately diminished speed of the other driven member, of a speed governing member driven forwardly at a slower rate of speed than the normal rate of drive of the driven members when the latter are driven forwardly and reversely at a quicker rate of speed than said driven members when the latter are driven reversely, and a spring-actuated clutch automatically operative on either forward or reverse drive to connect a driven member with the governing member when the speed of such driven member substantially equals the speed of the governing member.

16. The combination with a pair of driven members and intermediate connections permitting acceleration in speed of one of said driven members accompanied by a proportionately diminished speed of the other driven member, of a speed governing member driven at a uniform rate of speed in the same direction as the driven members but different from their normal rate of drive, and means for automatically connecting a driven member with said governing member, when the speed of such driven member substantially equals the speed of the governing member and also when a driven member travels reversely to said governing member.

17. The combination with a pair of driven members and intermediate connections permitting acceleration in speed of one of said driven members accompanied by a proportionately diminished speed of the other driven member, of a speed governing member driven at a uniform rate of speed in the same direction as the driven members, but different from their normal rate of drive, and a spring-actuated clutch automatically operative to connect a driven member with said governing member, when the speed of such driven member substantially equals the speed of the governing member and also when a driven member travels reversely to said governing member.

18. The combination with a pair of members adapted to be driven forwardly or reversely and intermediate connections permitting acceleration in speed of one of said members accompanied by a proportionately diminished speed of the other driven member, of a speed governing member, a forward driving connection adapted to be operated to drive said governing member forwardly at a uniform rate of speed in the same direction but different from the normal rate of drive of the driven members, a second driving connection adapted to be operated to drive said governing member reversely at a uniform rate of speed in the same direction but also different from the uniform rate of drive of the driven members, and means automatically operative either upon forward or reverse drive to connect a driven member with said governing member, when the speed of such driven member substantially equals the speed of the governing member, and also when said driven members are being driven in one direction, and a drive connection is in operative relation with said governing member to drive the latter in the reverse direction.

19. The combination with a pair of members adapted to be driven in either direction, and intermediate connections permitting acceleration in speed of one of said members accompanied by a proportionately diminished speed of the other driven member, of a speed governing member, reversible driving connections adapted to be operated to drive said governing member in the same direction as the driven members but at a different rate of speed, and means automatically operative to connect a driven member with said governing member, when the speed of such driven member substantially equals the speed of the governing member, and also when the driven members are reversed without reversing the drive connections for said governing member.

20. The combination with a pair of members adapted to be driven in either direction, and intermediate connections permitting acceleration in speed of one of said members accompanied by a proportionately diminished speed of the other driven member, of a speed governing member adapted to be driven forwardly or reversely at a uniform rate of speed, manually controlled connections for reversing the drive of said governing member, and means automatically operative to connect a driven member with said governing member when the speed of such driven member substantially equals the speed of the governing member and also when the driven members are reversed without reversing the drive of the governing member.

21. In a differential gearing such as described, the combination of a pair of driven members, a drive gear, gearing connections between each driven member and the drive gear for driving the driven members normally at equalized speeds and also permitting an acceleration in speed of one of the driven members accompanied by a proportionately diminished speed of the other driven member, a governing gear, connections for driving said governing gear in the same direction as the driven members, but at a different uniform speed, and a clutch mechanism for connecting a driven member with the governing gear, when the speed of the former substantially equals the speed of the latter.

22. In a differential gearing such as described, the combination of a pair of driven members, a drive gear, gearing connections between said driven members and the drive gear for driving the driven members normally at equalized speeds and also permitting an acceleration in speed of one of the driven members accompanied by a proportionately diminished speed of the other driven member, a governing gear, connections for driving said governing gear in the same direction as the driven members but at a different uniform rate of speed, and a spring-actuated clutch automatically operative to connect a driven member with the governing gear when the speed of the former substantially equals the speed of the latter.

23. The combination with a pair of driven members, a pair of drive gears mounted on the respective driven members, and means for connecting said members, said means permitting acceleration in speed of one of said driven members accompanied by a proportionately diminished speed of the other driven member, of a pair of speed governing members for the respective drive gears, said speed governing members being driven in unison at a uniform speed different from the normal rate of drive of the drive gears, and means for connecting a drive gear with the proximate speed governing member, when the speed of such drive gear substantially equals the speed of the governing members.

24. The combination with a pair of driven members, a pair of drive gears mounted on the respective driven members and adapted to drive the latter forwardly, or reversely, and means for connecting said members, said means permitting acceleration in speed of one of said driven members accompanied by a proportionately diminished speed of the other driven member, of a pair of speed governing members for the respective drive gears, means for driving said governing members forwardly in unison at a slower rate of speed than the normal rate of drive of the driven members when the latter are driven forwardly and for driving said governing members reversely in unison at a quicker rate of speed than said driven members when the latter are driven reversely, and means automatically operative on either forward or reverse drive to connect a driven member with the proximate governing member, when the speed of such driven member substantially equals the speed of the governing members.

25. The combination with a pair of driven members and differential gearing interposed between said members for permitting acceleration in speed of one of the driven members accompanied by a proportionate diminution in speed of the other driven member, of mechanism for limiting the ratio of differentiation of the driven members to a predetermined maximum ratio, thereby limiting the relative acceleration in speed which can be acquired by a member of the differential gearing.

26. The combination with a pair of driven members and differential gearing interposed between said members for permitting acceleration in speed of one of the driven members accompanied by a proportionate diminution in speed of the other driven member, said differential mechanism including the usual driven gears carried respectively by the driven members and the usual compensating pinions interposed between and in mesh with said driven gears, of mechanism for limiting the ratio of differentiation of the driven members to a predetermined maximum ratio, thereby limiting the relative acceleration in speed which can be acquired by either of the driven gears of the differential gearing.

27. The combination with a pair of driven members, a drive member, and differential gearing between said driven members, of means connecting said members, said means permitting at all times a difference in speed of said driven members, but limiting such difference in speed to a predetermined maximum ratio.

28. The combination with a pair of driven members, a drive member, and differential gearing between said driven members, of means for preventing backward movement of said driven members, means for preventing forward movement of said driven members, and means for rendering one of said means inoperative.

29. The combination with a pair of driven members, a drive member, and differential gearing between said driven members, of means for preventing backward movement of said driven members, means for preventing forward movement of said driven members, and means for rendering one of said means inoperative when the other means is operative.

30. The combination with a pair of driven members, a drive member, and differential gearing between said driven members, of means for preventing backward movement of either of said driven members or forward movement of one at a greater relative speed than a predetermined maximum ratio, means for preventing forward movement of either of said driven members or backward movement of one at a greater relative speed than a predetermined maximum ratio, and means for rendering one of said means inoperative.

31. The combination with a pair of driven members, a drive member, and differential gearing between said driven members, of means for preventing backward movement of either of said driven members or forward movement of one at a greater relative speed than a predetermined maximum ratio, means for preventing forward movement of either of said driven members or backward movement of one at a greater relative speed than a predetermined maximum ratio, and means for rendering one of said means inoperative when the other means is operative.

32. The combination with a pair of driven members, a drive member, and differential gearing between said driven members, of means for preventing backward movement of either of said driven members or forward movement of one at a greater relative speed than a predetermined maximum ratio, means for preventing forward movement of either of said driven members or backward movement of one at a greater relative speed than a predetermined maximum ratio, and means for rendering either or both of said means inoperative.

33. The combination with a pair of driven members, a drive member, differential gearing between the driven members, of a rotatable governor for preventing excess differentiation, and means for reversing the direction of rotation of the governor.

34. The combination with a pair of driven members, of a drive member, differential gearing between the driven members and means to drive one of the driven members positively from the drive member while the other driven member is being driven through the differential.

35. A device of the class described, comprising a pair of driven shafts, differential gearing connecting said shafts, means for driving said differential gearing, a clutch member having connections with said means whereby the clutch member is driven at a greater speed than said differential gearing, and automatic means operating between said clutch member and one of said driven shafts for causing said clutch to grip the shaft when the speed of said shaft is equal to or greater than the speed of the clutch.

36. A device of the class described, comprising a pair of driven shafts, differential gearing connecting said shafts, means for driving said differential gearing, a clutch member having connections with said means whereby the clutch member is driven at a less speed than said differential gearing, and automatic means operating between said clutch member and one of said driven shafts for causing said clutch to grip the shaft when the speed of said clutch is equal to or less than the speed of the clutch.

37. The combination of a pair of driven members, differential mechanism for driving said members, a pair of driven clutches coöperating with said driven members and arranged to operate in opposite directions, each of said clutches comprising two parts, and means for driving one part of each clutch at a fixed speed ratio to the driven member which it controls and the remaining part of each clutch at a fixed speed ratio to the average speed of the two driven members.

MAURITZ C. INDAHL.